US006621369B2

(12) United States Patent
Partanen

(10) Patent No.: US 6,621,369 B2
(45) Date of Patent: Sep. 16, 2003

(54) METHOD AND SYSTEM FOR DETERMINING TRANSMISSION PATH DELAY

(75) Inventor: Timo Partanen, Oulu (FI)

(73) Assignee: Nokia Corporation, Espoo (FI)

( * ) Notice: Subject to any disclaimer, the term of this patent is extended or adjusted under 35 U.S.C. 154(b) by 102 days.

(21) Appl. No.: 09/997,242

(22) Filed: Nov. 30, 2001

(65) Prior Publication Data

US 2003/0102933 A1 Jun. 5, 2003

(51) Int. Cl.[7] ................................................ H03H 11/30
(52) U.S. Cl. ...................... 333/17.3; 333/22 R; 326/30
(58) Field of Search ...................... 333/18, 17.3, 22 R; 326/30; 324/76.35; 395/500.07

(56) References Cited

U.S. PATENT DOCUMENTS 5,570,054 A    10/1996   Takla ........................... 327/292
5,802,390 A  * 9/1998   Kashiwaga et al. .......... 395/821

* cited by examiner

Primary Examiner—Robert Pascal
Assistant Examiner—Stephen E. Jones
(74) Attorney, Agent, or Firm—Pillsbury Winthrop LLP

(57) ABSTRACT

The invention relates to transmission path delay determination between a first and a second electronic circuit coupled to each other by a transmission path. A determination method includes, among other operations, transmitting at least one test signal from a first electronic circuit to a second electronic circuit, receiving at the first electronic circuit a reflection of the test signal from the second electronic circuit, measuring a time duration necessary for receiving the reflection of the test signal, determining a transmission path delay as half of the measured time duration, reconfiguring the line impedance termination between the first and second electronic circuit, adjusting the timing of a payload signal on the basis of the transmission path delay, and transmitting the payload signal between the first and second electronic circuit.

30 Claims, 2 Drawing Sheets

METHOD AND SYSTEM FOR DETERMINING TRANSMISSION PATH DELAY

FIELD

The invention relates to transmission path delay determination.

BACKGROUND

In electronic devices, such as base stations of radio systems, signals are transmitted between different electronic circuits. The circuits may form what is known as a driver/receiver pair, in which the driver transmits a data signal, such as a clock signal, to the receiver.

The transmission media may be, for example, a wire printed on a circuit board, a cable, connectors, or the like, placed between and coupling the driver and the receiver, and will always delay propagation of the signal. An electronic device may comprise a plural number of driver/receiver pairs, and the elements of the pairs may appear in diverse parts of the electronic device. For example, a base station may comprise a driver, which may be a transceiver, and a receiver, which may be a frequency amplifier, frequency synthesizer or masthead amplifier connected to the transceiver.

An electronic device may comprise a plurality of driver/receiver pairs providing the same functionality, the proper functioning of the device requiring the signal, such as a clock signal, transmitted by the drivers to be received simultaneously at each respective receiver. A problem arises from the transmission media used between the different driver/receiver pairs because the delay caused by the media may vary according to each pair. This is due to variations in the physical length of the wire and the electric properties of the wire and the connectors.

Different solutions have been proposed to this problem. The electronic device may be designed to tolerate delays of a specific length. This, however, complicates the planning of the device and, in addition, may require an additional buffer memory. Another solution is to calculate the lengths of the delays and provide the device with a fixed signal timing adjustment for balancing the delays. This solution is not, however, feasible for base stations, where the length of the transmission media between the transceiver and the masthead amplifier may vary from dozens of centimeters to dozens of meters, for example. In other words, the length of the transmission media varies according to the product and/or application environment. Similarly, the electric properties of the transmission media may vary depending on the supplier.

U.S. Pat. No. 5,570,054 discloses a solution in which double wiring is used between the driver/receiver pair for supplying the signal from the driver to the receiver and for receiving feedback of the phase difference from the receiver to the driver. The feedback is used for correcting the signal phase. The solution requires double wiring and, since it is a continuous operation, it increases the power consumption of the device.

BRIEF DESCRIPTION

The present invention seeks to provide an improved method and apparatus. According to at least one embodiment of the present invention, a method is provided in which a transmission path delay is determined based on a measured time duration necessary for receiving a reflection of a test signal, a line impedance termination between a first and second electronic circuit is reconfigured and timing of a payload signal is adjusted based on the transmission path delay.

According to at least one embodiment of the present invention, a system is provided means for measuring a time duration necessary for receiving a reflection of a test signal, means for determining a transmission path delay as half of the measured time duration, means for reconfiguring a line impedance termination circuit after the transmission path delay has been determined; and means for adjusting the timing of the transmission of the payload signal on the basis of the transmission path delay.

According to at least one embodiment of the present invention, a system is provided including a first electronic circuit that is configured to receive a reflection of a test signal from a second electronic circuit, measure a time duration necessary for receiving the reflection of the test signal, determine a transmission path delay as half of the measured time duration, and adjust the timing of the transmission of a payload signal based on the transmission path delay.

LIST OF FIGURES

Embodiments of the invention are described below by way of example and with reference to the attached drawings, in which.

DESCRIPTION OF INVENTION EMBODIMENTS

Embodiments of the invention are based on the fact that the transmission media between the electronic circuits is normally subjected to impedance matching to prevent reflections. Now impedance matching configuration is used to create reflections in the transmission media for estimating the transmission delay caused by the transmission media. In other words, a non-ideal situation is deliberately created in an attempt to make use of it.

The solution is relatively simple to implement, it does not need to be applied during the entire transmission of the payload, and it does not require separate wiring for receiving feedback.

Figure 1:
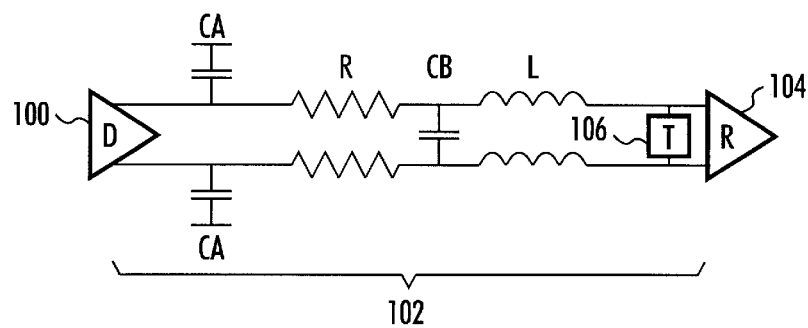
FIG. 1 is a simplified block diagram illustrating a driver/receiver pair.

FIG. 1 shows one implementation of a driver/receiver pair, in which a driver 100 is coupled to a receiver 104 by a transmission path 102. The transmission path 102 may be implemented as a transmission line, for example. The transmission path 102 may comprise parasitic capacitance CA, CB, resistance R and inductance L.

In the transmission of a signal from the driver 100 to the receiver 104, the aim is to lose as little of the signal power as possible on the transmission path 102. This requires that the load be matched to the characteristic impedance of the transmission path 102 so that the standing-wave ratio of the transmission path 102 is as close to unity as possible. When an information-containing signal is being transmitted on the transmission path 102, it is necessary that the transmission path 102 is matched because reflections from mismatched loads distort the information content of the signal. This impedance matching (or impedance tuning) procedure is well known to persons skilled in the art.

Accordingly, an impedance matching network may be placed between load impedance and a transmission line. The impedance matching shown in FIG. 1 may be carried out by coupling two wires, which form the transmission path 102, to a resistor 106 responsible for adjusting the impedance of the driver 100 to that of the transmission path 102.

Next, a method for determining a transmission path delay between a first and a second electronic circuit (coupled to each other by a transmission path) will be described with reference to FIG. 5. The first electronic circuit may refer to the driver 100, and the second electronic circuit to the receiver 104, although the disclosed method may also be applied to other pairs forming a first and a second electronic circuit. The transmission path 102 may be implemented as a transmission line, although other alternatives employing impedance matching are also applicable in the method. One example of the transmission line implementation is to use two wires and a differential voltage between them for presenting data in a test signal and a payload signal.

Figure 5:
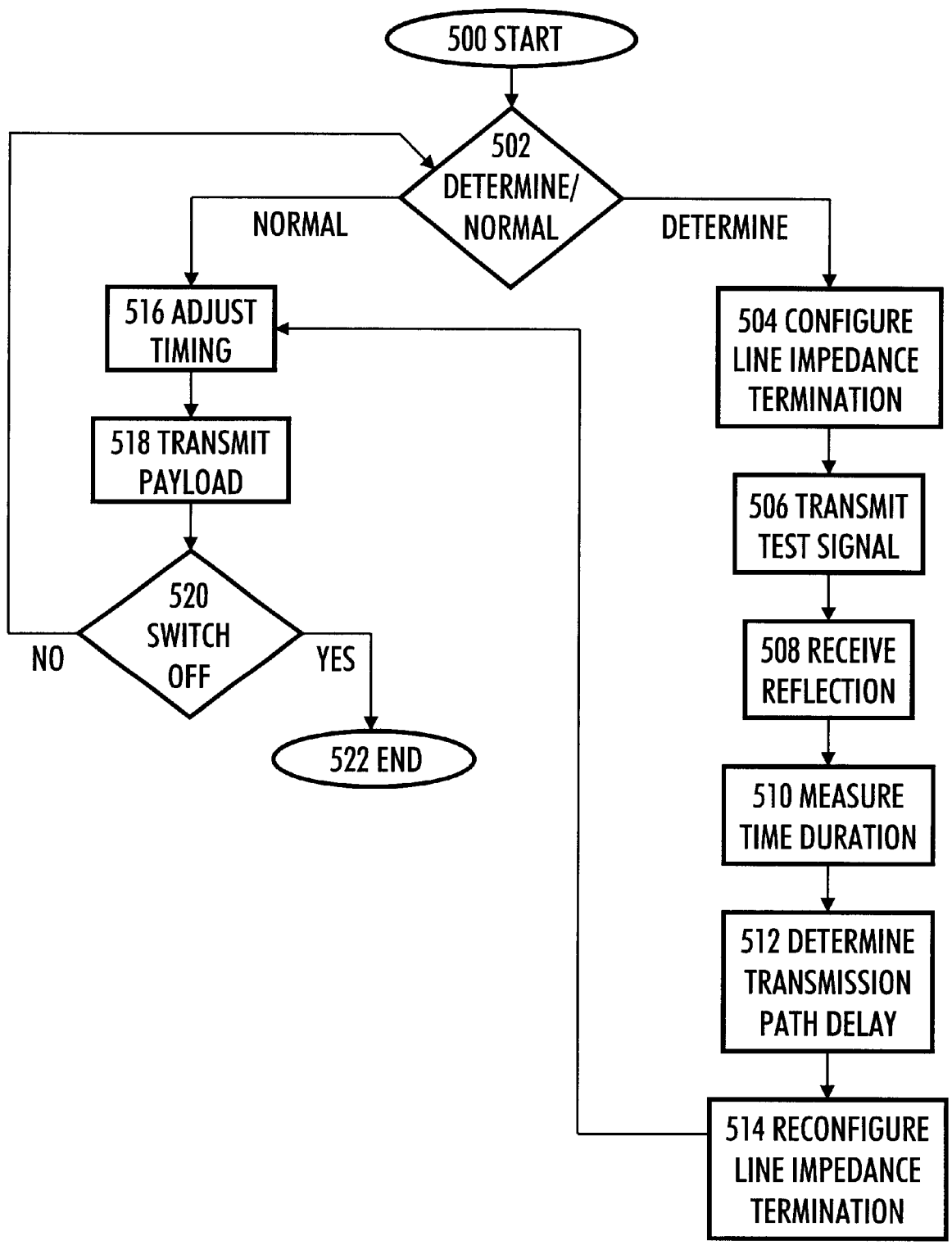
FIG. 5 is a flow diagram illustrating a method for determining a transmission path delay between a first and a second electronic circuit coupled to each other by a transmission path.

As illustrated in FIG. 5, the execution of the method starts at 500. Stimulus for starting the method may be caused by the startup of the first and second electronic circuit. For example, if the electronic circuits are located at the base station, it is natural that the transmission delay of the transmission path 102 employed is determined in connection with the startup of the base station.

Alternatively, the stimulus may be provided at regular intervals determined according to an application concerned. At a base station, for example, the transmission delay could be determined on a weekly or monthly basis. For the regular interval to be determined, the electronic circuits must be provided with a timer or a clock or connected to one to allow the regular interval to be detected. An advantage of the regular determining is that the transmission delay may change, in which case it needs to be re-determined. The transmission delay may change either because the length of the transmission path 102 changes or because the electric properties of the transmission path 102 change, for example due to changes in the ambient temperature of the transmission path 102, aging of the material used for implementing the transmission path 102, or manufacturing differences relating to the transmission path 102.

It is also possible that the method illustrated in FIG. 5 may be triggered upon receipt of a command for determining the transmission delay. For example, the base station may be locally connected to a control device issuing the command to the base station. The base station may also be connected to the network management system of the radio system to receive remote control over a data transfer link. This may allow the transmission delay to be determined whenever desired.

Following beginning operations at 500, the routine proceeds to 502, at which it is decided whether a transmission delay will be determined or whether the transmission delay already determined is used. The transmission delay may already have been determined using the described method or as a default transmission delay included into the system by the manufacturer. If a stimulus for beginning the method illustrated in FIG. 5 has been given, transmission delay determination is selected at 502 and the routine proceeds to 504. If it is determined that a predetermined transmission delay is to be used, or a default provided by a manufacturer, the routine proceeds to 516 (explained below).

At 504, a line impedance termination between the first and second electronic circuit is configured. The configuration may be carried out such that the impedance of the transmission path 102 is no longer matched. The configuration may be an on/off-type operation, or a gradual one. In a gradual configuration, some values may represent normal operation and others may represent transmission delay determination. Impedance matching may be applied in normal operation, whereas in delay determination it may not.

The routine then proceeds to 506, at which at least one test signal is transmitted from the first electronic circuit to the second electronic circuit. Then, at 508, a reflection of the test signal from the second electronic circuit may be received at the first electronic circuit. The test signal may be reflected back because the line impedance termination may be configured at 504 so that it is no longer active, or it is so weak that it does not prevent the signal from being reflected back.

The routine then proceeds to 510, at which a time duration necessary for receiving the reflection of the test signal is measured. In other words, the time from the transmission of the test signal at 506 to the receipt of the test signal reflection at 508 is measured. The routine then proceeds to 512, at which the transmission path delay is determined as half of the measured time duration. Since the test signal and the reflection of the test signal propagate on the same transmission path at the same speed, the transmission path delay is half of the measured time. If the test signal transmitted by the first electronic circuit reaches the second electronic circuit after a propagation delay $t_1$ and the test signal reflection from the second electronic circuit reaches the first electronic circuit after a propagation delay $t_2$, then the propagation delay between the circuits can be mathematically expressed as follows:

$$t_p = \frac{t_1 + t_2}{2} \qquad (1)$$

Since the test signal and its reflection propagate on the same transmission path, then $t_1=t_2$, $t_p$ being equal to half of the measured propagation delay of the signal and its reflection.

To complete the determining operation, at 514, the line impedance termination between the first and second electronic circuit is reconfigured. In this reconfiguration, the line impedance termination is set to the position required by normal operation, e.g., it is activated, to prevent nondesirable reflections.

Alternatively, the determination of the time duration may be performed by transmitting more than one test signal consecutively. In that case, the reflection of each test signal may be received after the corresponding transmission of the test signal, and before the transmission of a next test signal. With transmission of a plurality of test signals, it is possible to achieve greater precision in the transmission delay determination. The transmission delay can then be determined, for example, as an average or a median of the determined transmission delays, or as some other mathematical variable representing an average.

When the determination of the transmission delay has been accomplished, the routine proceeds to 516. As already stated, the operations performed at 502–514 in FIG. 5 represent transmission delay determination and, correspondingly, the operations performed at 516–522 represent normal operation, e.g., the transmission of payload on the transmission path.

At 516, the timing of a payload signal is adjusted on the basis of the transmission path delay. As already stated, the transmission path delay may be a default setting, a previously determined transmission path delay, or one that is determined just before at 502–514.

The routine then proceeds to 518, at which the payload signal may be transmitted between the first and second electronic circuit. In this context, the term payload may refer to all signals deviating from the test signal. For example, if the electronic circuits are located at the base station, payload may refer to the radio signals transmitted by the base station to a subscriber terminal and to those received from the terminal, or to clock signals to be used for the internal control and timing of the base station, for example.

The routine may then proceeds to 520, at which a determination is made whether the system comprising the electronic circuits has been switched off. If the system is still on, the routine returns to 502, to determine again the operation to be carried out next. If the system has been switched off, the routing proceeds to 522 at which the method ends.

Next, a transmission path delay determination system will be described with reference to FIG. 2. The example shows again a pair formed by the driver 100 and the receiver 104. As distinct from FIG. 1, however, there are two driver/receiver pairs, instead of one. The system may also function in other environments than with the driver/receiver pairs of the example, e.g., in environments where signals are transmitted between two electronic circuits over a transmission path connecting them and in which impedance matching is applied to the transmission path.

In the first pair, a first electronic circuit 200 is coupled to a second electronic circuit 204 by a first transmission path 202, and a resistor 206 is used to implement the impedance matching of the first transmission path 202. The length of the transmission path 202 in the first pair is T1.

In the second pair, a first electronic circuit 210 is coupled to a second electronic circuit 214 by a second transmission path 212 and the resistor 216 is used to implement the impedance matching of the second transmission path 212. The length of the transmission path 212 in the second pair is T2.

A comparison between the lengths of T1 and T2 shows that T2 is longer than T1. Hence the transmission delay of the second transmission path 212 is longer than that of the first transmission path 202. In this example, the proper functioning of the system may require that all receivers 204, 214 receive the signal, such as a clock signal, transmitted by the drivers 200, 210 in their respective pairs simultaneously or at a predetermined and known delay. To ensure this, the signal transmitted on the first transmission path 202 may be delayed in relation to the signal transmitted on the second transmission path 212 by a time duration corresponding to the propagation of the signal over a distance obtained by subtracting T1 from T2. The delays of both transmission paths 202, 212 can be determined separately; the signals to be transmitted may then be timed according to the transmission delays.

It should be understood that other factors besides the length of the transmission path 202, 212 may have an impact on the transmission delay, for example the operation temperature, the materials of the transmission path 202, 212, and the connectors used on the transmission path 202, 212.

Consider a situation where the first electronic circuit 200, 210 is configured to transmit a payload signal, and the second electronic circuit 204, 214 is coupled to the first electronic circuit 200, 210 by the transmission path 202, 212 and configured to receive the payload signal. In addition to this, a line impedance termination circuit 206, 216 is coupled to the transmission path 202, 212.

For transmission delay determination, the first electronic circuit 200, 210 may be configured to reconfigure the line impedance termination circuit 206, 216 before transmitting a test signal. The first electronic circuit 200, 210 may be configured to transmit at least one test signal to the second electronic circuit 204, 214 and to receive a reflection of the test signal from the second electronic circuit 204, 214. The first electronic circuit 200, 210 may also be configured to measure a time duration necessary for receiving the reflection of the test signal and to determine a transmission path 202, 212 delay as half of the measured time duration. The first electronic circuit 200, 210 may be configured to reconfigure the line impedance termination circuit 206, 216, after it has determined the transmission path 202, 212 delay.

For normal operation, the first electronic circuit 200, 210 may be configured to adjust the timing of the transmission of the payload signal on the basis of the transmission path 202, 212 delay.

In at least one embodiment, the first electronic circuit 200, 210 is configured to transmit more than one test signal consecutively and to receive the reflection of the test signal after each transmission, before the next test signal is transmitted.

In at least one embodiment the transmission path 202, 212 is a transmission line. In this embodiment, the first electronic circuit 200, 210 may be configured to use a differential voltage for the test signal and the payload signal on the transmission path 202, 212, although a skilled person may readily use also other ways of presenting data, provided that they are consistent with the basic idea of configurable impedance matching and its use in the transmission delay determination system.

In at least one embodiment, the transmission path delay determination system is configured to operate at the startup of the first and second electronic circuit 200, 210; and/or at regular intervals, and/or after having received a command to do so, the transmission path delay determination system being configured to receive the command 220 from a system controlling the transmission delay determination system. This last configuration can be implemented by means 224 coupled to a control circuit 222 for receiving the command. These means 224 can be implemented according to the prior art, for example as a connector to which a control device can be coupled, or as a data transfer device receiving remote control from a control device connected to the data transfer device over a data transfer link.

The required configuration of the first electronic circuit 200, 210 may be implemented with a control circuit 222 coupled to the first electronic circuit 200, 210 and responsible for the described control and operation.

Figure 2:
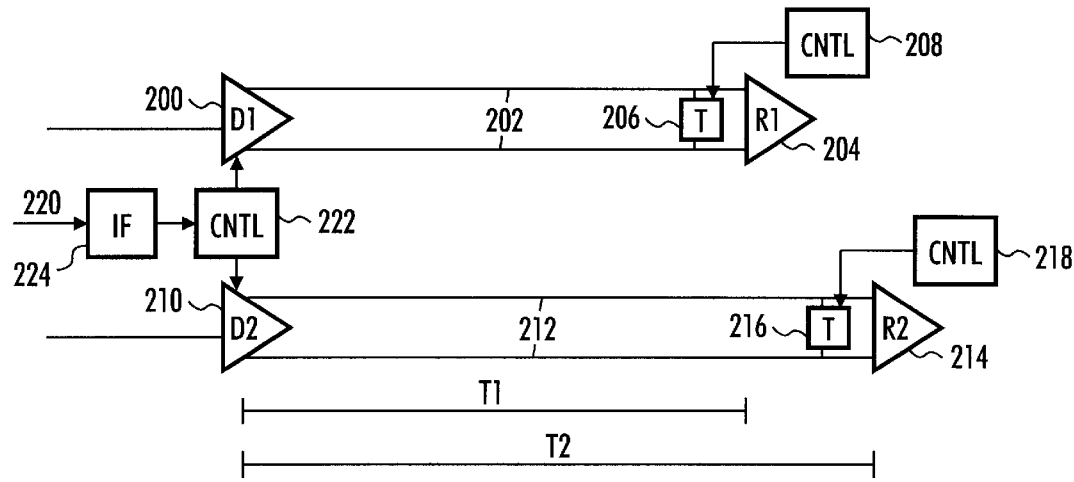
FIG. 2 is a simplified block diagram illustrating a transmission path delay determination system.

In the example of FIG. 2, the line impedance termination circuit 206, 216 is coupled to the transmission path 202, 212 at an end where the second electronic circuit 204, 214 is coupled to the transmission path 202, 212. In that case, the configuration of the second electronic circuit may be implemented by means of a control circuit 208, 218 connected to each one of the second electronic circuits 204, 214 and responsible for the described control and operation. In the example of FIG. 2, the control of the first electronic circuit 200 and the second electronic circuit 204 may be decentralized and its synchronization may be carried out in a conventional manner, for example by means of control signals exchanged between the circuits 200, 204.

Figure 3:
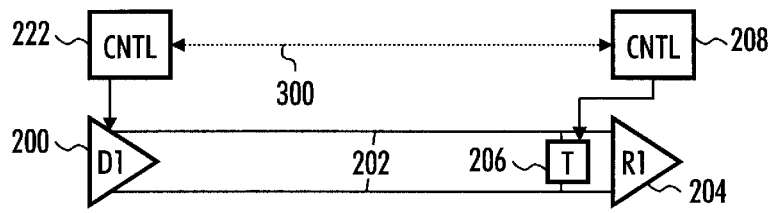
FIG. 3 illustrates an alternative embodiment of the transmission path delay determination system.

FIG. 3 illustrates an alternative for the solution shown in FIG. 2. In this case, the first electronic circuit 200 may be configured to signal a reconfiguration command 300 from the first electronic circuit 200 to the line impedance termination circuit 206. In other words, the reconfiguration command 300 may provide control synchronization between the first electronic circuit 200 and the second electronic circuit 204. The reconfiguration command 300 may be relayed over the transmission path 202, for example.

Figure 4:
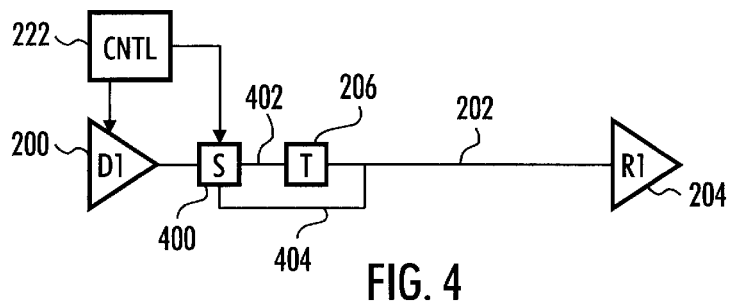
FIG. 4 illustrates an alternative embodiment of the transmission path delay determination system.

FIG. 4 illustrates an alternative for the solution shown in FIG. 2, which uses single-ended voltage instead of differential voltage in the transmission path 202. In this case, the line impedance termination circuit 206 is coupled to the transmission path 202 at an end where the first electronic circuit 200 is coupled to the transmission path 202. In this embodiment, a separate control for the transmission delay determination may be not required in circuit 204, but a switch 400 may be directly controlled by the control circuit 222 coupled to the first electronic circuit 200. When the switch 400 is switched on, the signal proceeds to the line impedance termination circuit 206 over path 402. When the switch is switched off, the signal bypasses the line impedance termination circuit 206 over path 404. Of course, this could also be implemented in such a way that the line impedance termination circuit 206 is configurable, whereby no extra switch 400 would be needed.

The control circuit 208, 218, 222 can be used for implementing means for reconfiguring the line impedance termination circuit before a test signal is transmitted, means for transmitting at least one test signal from the first electronic circuit to the second electronic circuit, means for receiving, at the first electronic circuit, a reflection of the test signal from the second electronic circuit, means for measuring a time duration necessary for receiving the reflection of the test signal, means for determining a transmission path delay as half of the measured time duration, means for reconfiguring the line impedance termination circuit the transmission path delay has been determined, and means for adjusting the timing of the transmission of the payload signal on the basis of the transmission path delay.

The control circuit 208, 218, 222 and the means to be implemented using the circuit can be implemented conventionally, for example, as a processor including the related software into which the required functionality has been programmed; as an application specific integrated circuit (ASIC); as an operating logic built of separate logic components; or as different combinations of the above. When selecting the method of implementation, a person skilled in the art will take into account for example the following factors: the required processing capacity, power consumption, manufacturing volumes, costs of manufacture, requirements set to the size of the device, durability, and other similar factors having a bearing on the decision.

Although the invention has been explained in the above with reference to examples in accordance with the accompanying drawings, it is obvious that the invention is not restricted to them but can be modified in many ways within the scope of the inventive idea disclosed in the attached claims.

What is claimed is:

1. A transmission path delay determination system comprising:

a first electronic circuit configured to transmit a payload signal;

a second electronic circuit coupled to the first electronic circuit by a transmission path and configured to receive the payload signal;

a line impedance termination circuit coupled to the transmission path;

means for reconfiguring the line impedance termination circuit before a test signal is transmitted;

means for transmitting at least one test signal from the first electronic circuit to the second electronic circuit;

means for receiving, at the first electronic circuit, a reflection of the test signal from the second electronic circuit;

means for measuring a time duration necessary for receiving the reflection of the test signal;

means for determining a transmission path delay as half of the measured time duration;

means for reconfiguring the line impedance termination circuit after the transmission path delay has been determined; and means for adjusting the timing of the transmission of the payload signal on the basis of the transmission path delay.

2. The transmission path delay determination system of claim 1, wherein the means for transmitting the test signal transmits more than one test signal consecutively.

3. The transmission path delay determination system of claim 2, wherein after each transmission of a test signal, the receiving means receives the reflection of the test signal before the next test signal is transmitted.

4. The transmission path delay determination system of claim 1, wherein the transmission path is a transmission line.

5. The transmission path delay determination system of claim 1, wherein the transmitting means uses a differential or single-ended voltage for the test signal and the payload signal on the transmission path.

6. The transmission path delay determination system of claim 1, wherein the transmission delay determination system operates at the startup of the first and second electronic circuit.

7. The transmission path delay determination system of claim 1, wherein the transmission delay determination system operates at regular intervals.

8. The transmission path delay determination system of claim 1, wherein the transmission delay determination system further comprises means for receiving a command and operates in response to the command.

9. The transmission path delay determination system of claim 1, wherein the line impedance termination circuit is coupled to the transmission path at an end where the first electronic circuit is coupled to the transmission path.

10. The transmission path delay determination system of claim 1, wherein the line impedance termination circuit is coupled to the transmission path at an end where the second electronic circuit is coupled to the transmission path.

11. The transmission path delay determination system of claim 1, the system further comprising means for signaling a reconfiguration command from the first electronic circuit to the line impedance termination circuit.

12. A transmission path delay determination system, comprising:

a first electronic circuit configured to transmit a payload signal;

a second electronic circuit coupled to the first electronic circuit by a transmission path and configured to receive the payload signal;

a line impedance termination circuit coupled to the transmission path;

wherein the first electronic circuit is configured to reconfigure the line impedance termination circuit before transmitting a test signal;

the first electronic circuit is configured to transmit at least one test signal to the second electronic circuit;

the first electronic circuit is configured to receive a reflection of the test signal from the second electronic circuit;

the first electronic circuit is configured to measure a time duration necessary for receiving the reflection of the test signal;

the first electronic circuit is configured to determine a transmission path delay as half of the measured time duration;

the first electronic circuit is configured to reconfigure the line impedance termination circuit after having determined the transmission path delay; and the first electronic circuit is configured to adjust the timing of the transmission of the payload signal on the basis of the transmission path delay.

13. The transmission path delay determination system of claim 12, wherein the first electronic circuit is configured to transmit more than one test signal consecutively.

14. The transmission path delay determination system of claim 13, wherein the first electronic circuit is configured to receive, after each transmission of a test signal, the reflection of the test signal before the next test signal is transmitted.

15. The transmission path delay determination system of claim 12, wherein the transmission path is a transmission line.

16. The transmission path delay determination system of claim 12, wherein the first electronic circuit is configured to use a differential or single-ended voltage for the test signal and the payload signal on the transmission path.

17. The transmission path delay determination system of claim 12, wherein the transmission delay determination system is configured to operate at the startup of the first and second electronic circuit.

18. The transmission path delay determination system of claim 12, wherein the transmission delay determination system is configured to operate at regular intervals.

19. The transmission path delay determination system of claim 12, wherein the transmission delay determination system is configured to receive a command and to operate in response to the command.

20. The transmission path delay determination system of claim 12, wherein the line impedance termination circuit is coupled to the transmission path at an end where the first electronic circuit is coupled to the transmission path.

21. The transmission path delay determination system of claim 12, wherein the line impedance termination circuit is coupled to the transmission path at an end where the second electronic circuit is coupled to the transmission path.

22. The transmission path delay determination system of claim 12, wherein the first electronic circuit is configured to signal a reconfiguration command from the first electronic circuit to the line impedance termination circuit.

23. A method for determining a transmission path delay between a first and a second electronic circuit coupled to each other by a transmission path, the method comprising:

configuring a line impedance termination between the first and second electronic circuit;

transmitting at least one test signal from the first electronic circuit to the second electronic circuit;

receiving, at the first electronic circuit, a reflection of the test signal from the second electronic circuit;

measuring a time duration necessary for receiving the reflection of the test signal;

determining a transmission path delay as half of the measured time duration;

reconfiguring the line impedance termination between the first and second electronic circuit;

adjusting the timing of a payload signal on the basis of the transmission path delay; and transmitting the payload signal between the first and second electronic circuit.

24. The method of claim 23, wherein more than one test signal is sent consecutively.

25. The method of claim 24, wherein after each transmission of the test signal the reflection of the test signal is received before the next test signal is transmitted.

26. The method of claim 23, wherein the transmission path is a transmission line.

27. The method of claim 23, wherein the test signal and the payload signal are transmitted using a differential or single-ended voltage on the transmission path.

28. The method of claim 23, wherein the transmission path delay is determined at the startup of the first and second electronic circuit.

29. The method of claim 23, wherein the transmission path delay is determined at regular intervals.

30. The method of claim 23, wherein the transmission path delay is determined in response to a command to do so.

* * * * *